Figure 1:
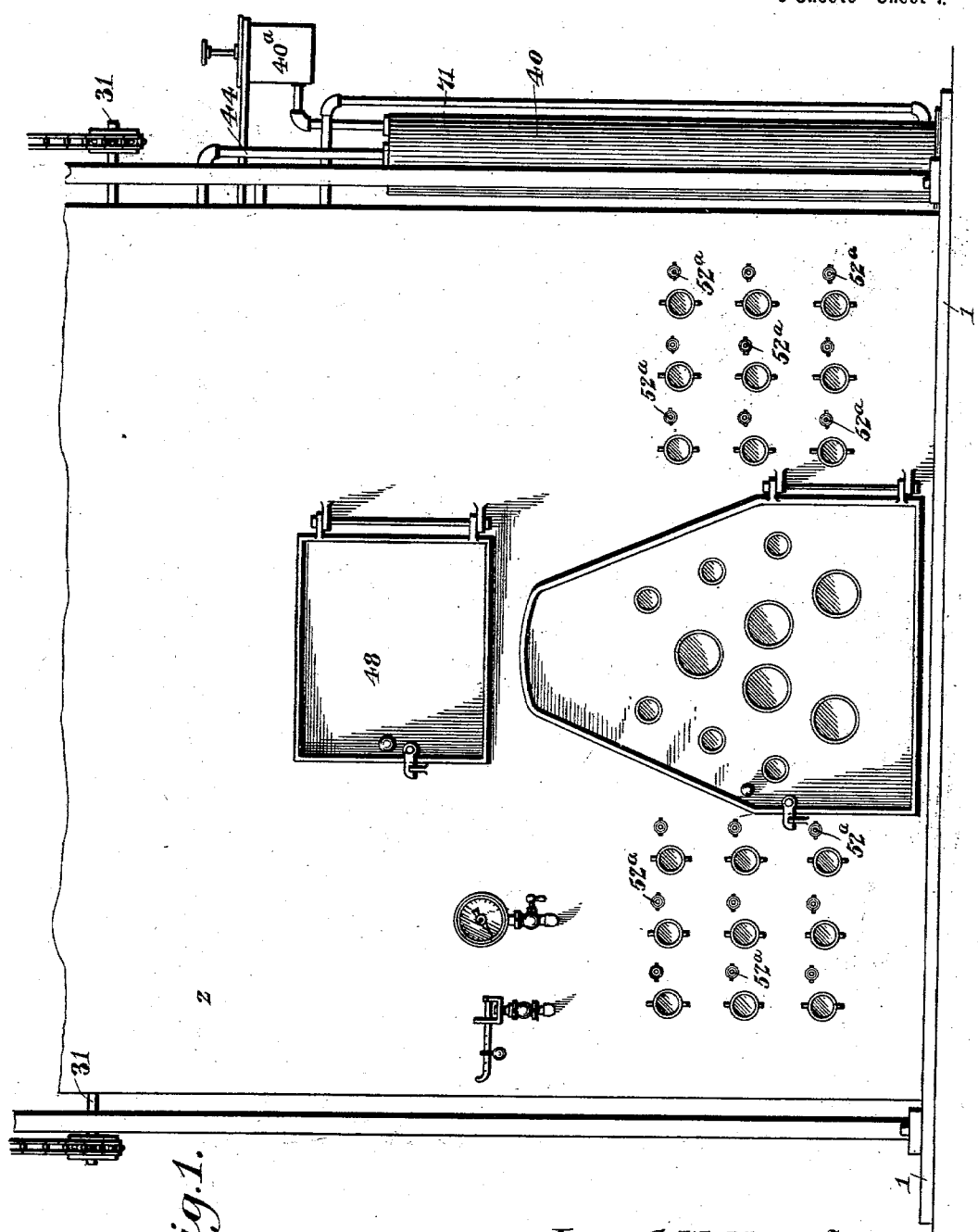

No. 704,722. Patented July 15, 1902.
J. C. WALKER.
STEAM GENERATOR.
(Application filed Feb. 14, 1901.)

(No Model.) 6 Sheets—Sheet I.

James C. Walker, Inventor

Witnesses
Jas. R. McCathran
Louis G. Julihn

By
C. G. Siggers
Attorney

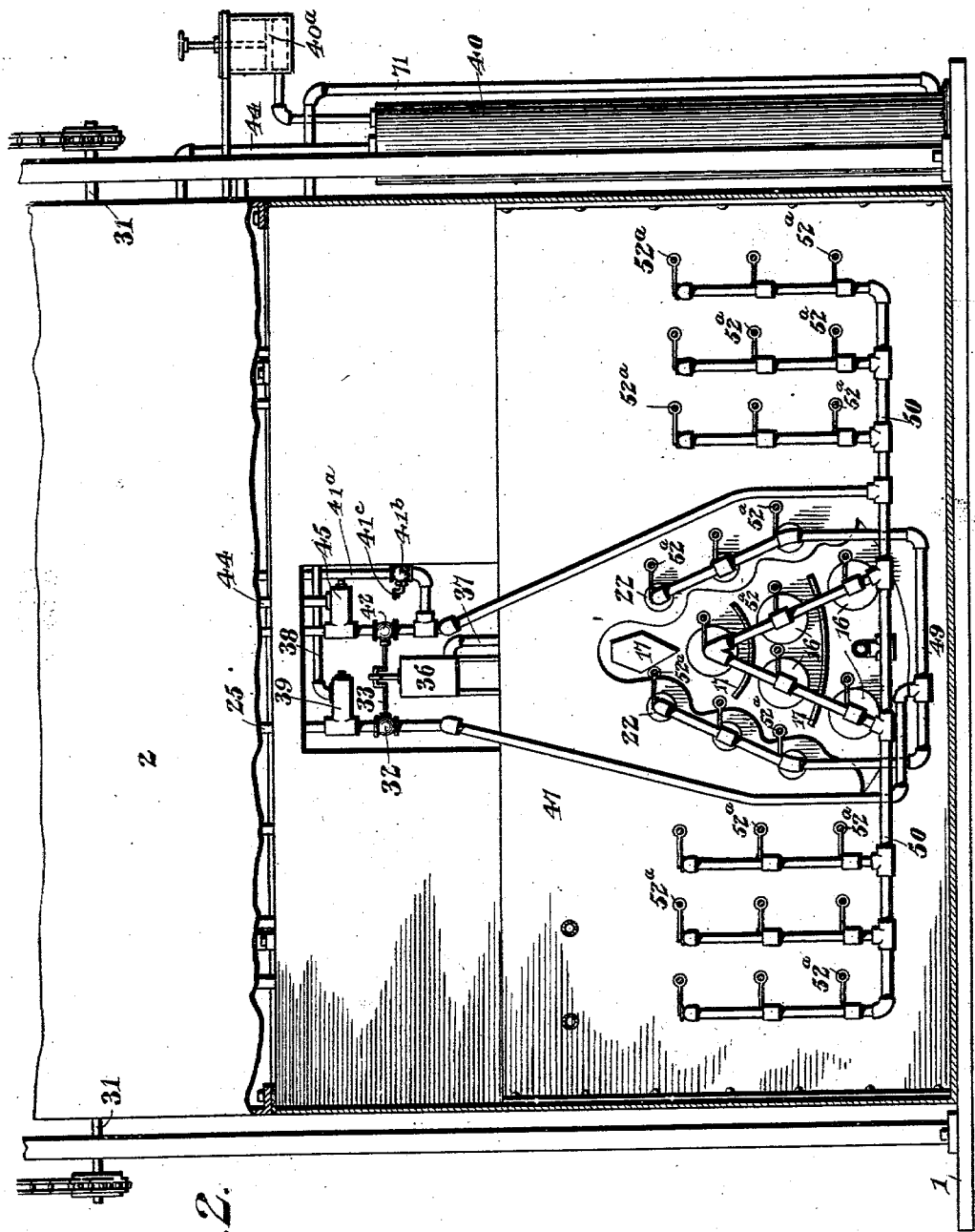

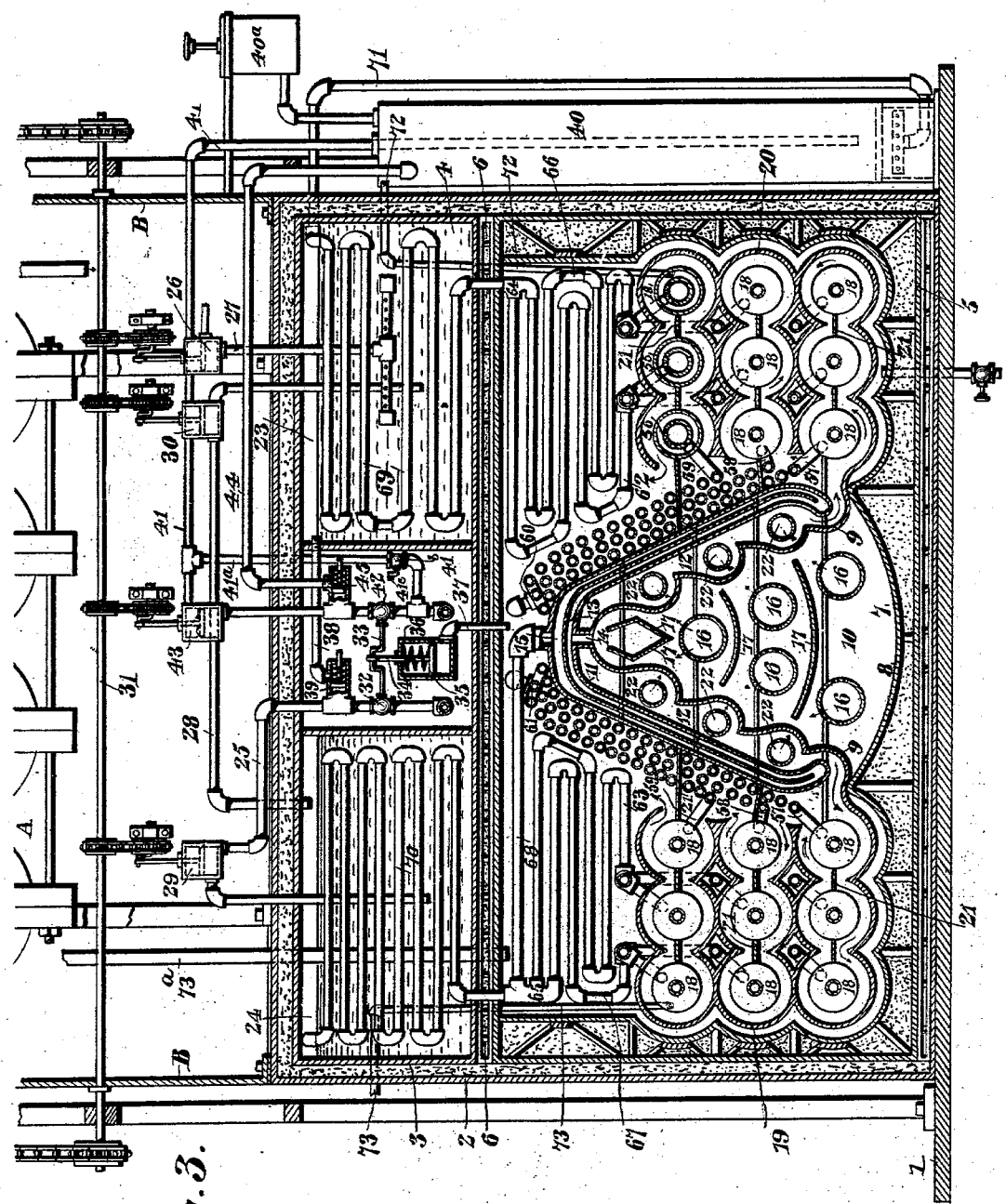

No. 704,722. Patented July 15, 1902.
J. C. WALKER.
STEAM GENERATOR.
(Application filed Feb. 14, 1901.)
(No Model.) 6 Sheets—Sheet 4.
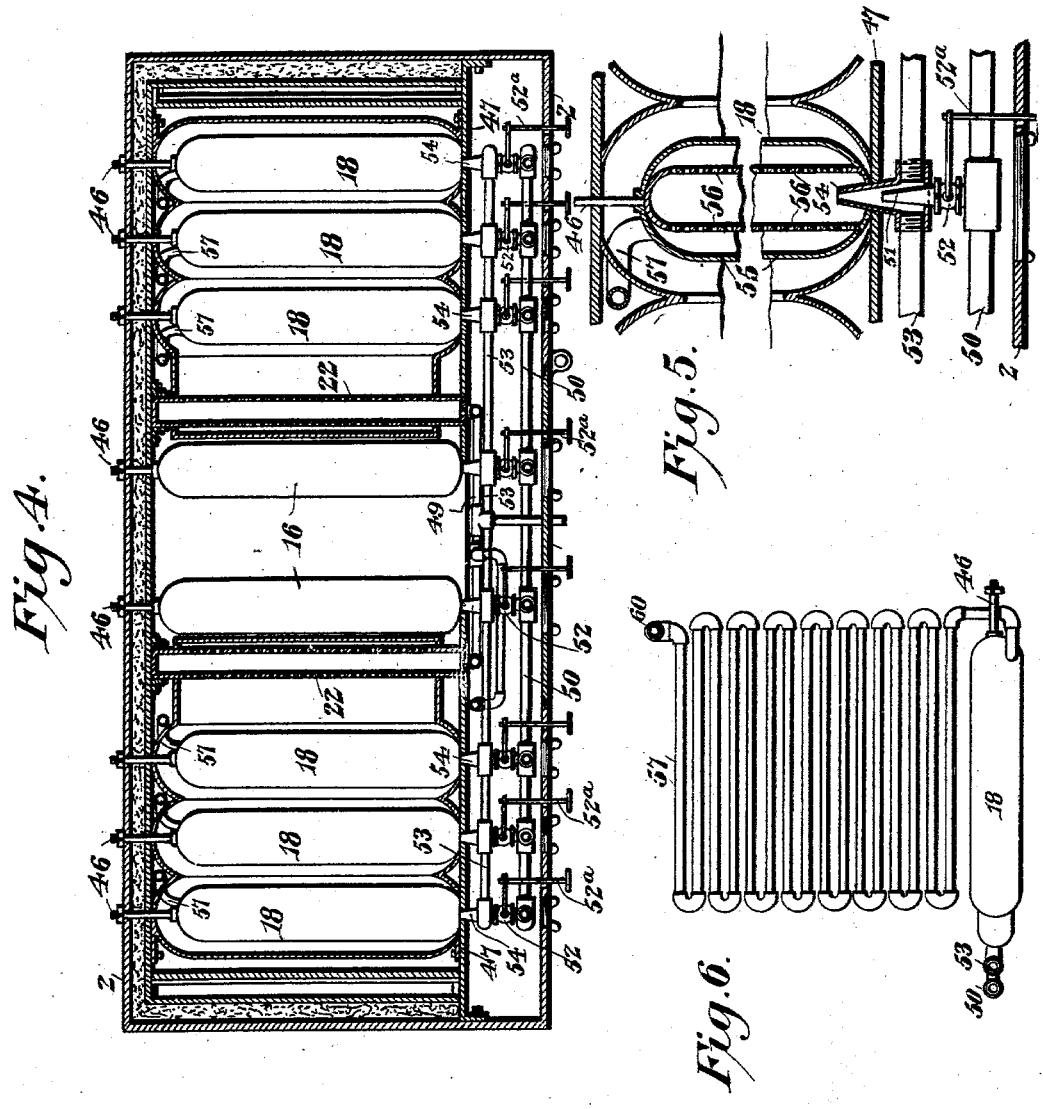

No. 704,722. Patented July 15, 1902.
J. C. WALKER.
STEAM GENERATOR.
(Application filed Feb. 14, 1901.)
(No Model.) 6 Sheets—Sheet 5.

James C. Walker, Inventor

No. 704,722. Patented July 15, 1902.
J. C. WALKER.
STEAM GENERATOR.
(Application filed Feb. 14, 1901.)
(No Model.) 6 Sheets—Sheet 6.
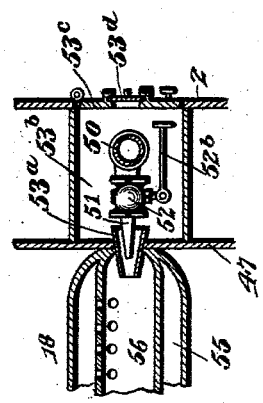

UNITED STATES PATENT OFFICE.

JAMES C. WALKER, OF WACO, TEXAS.

STEAM-GENERATOR.

SPECIFICATION forming part of Letters Patent No. 704,722, dated July 15, 1902.

Application filed February 14, 1901. Serial No. 47,321. (No model.)

*To all whom it may concern:*

Be it known that I, JAMES C. WALKER, a citizen of the United States, residing at Waco, in the county of McLennan and State of Texas, have invented a new and useful Steam-Generator, of which the following is a specification.

My present invention relates to a novel generator designed with special reference to the requirements of motor-vehicles, but capable of use in any connection where a completely automatic generator of light compact form is desirable.

One object of the invention is to produce a generator in which water at a high temperature or saturated steam is supplied to a superheating-chamber from one or more water-compartments removed therefrom, whereby the tension of the steam is raised and the steam thoroughly dried prior to its delivery to the motor.

Another object of the invention is to lead the water or saturated steam from a remote low-pressure chamber and to flash it in the form of a spray against a highly-heated surface to convert it into superheated steam prior to its passage through a circuitous drying-chamber, from whence the steam is led to the motor.

A further object of the invention is to automatically regulate the supply of water or saturated steam to the superheater through the medium of the steam-pressure within the latter and to provide for the automatic relief of the water and fuel conduits when the supply of water to the superheater and of fuel to the furnace is cut off or reduced by the steam-pressure.

A further object of the invention is to supply the generator proper or steam-chamber with water or steam from a removed water-chamber receiving its supply from an initial water-chamber and heated by the utilization of products of combustion passing from the burners of the furnace and driers.

A still further object of the invention is the protection of the walls of the superheating-chamber by the nesting thereon of a series of coils leading from the several sets of drier-burners and the utilization of other coils for the conveyance of the products of combustion from other sets of drier-burners through the steam-space of the superheater before delivering said products to the heating appliances within the water-tanks; and still further objects of the invention will hereinafter more fully appear as the necessity for their accomplishment is developed in the succeeding description of the preferred form of my generator illustrated in the accompanying drawings and embraced within the scope of the appended claims.

Figure 8:
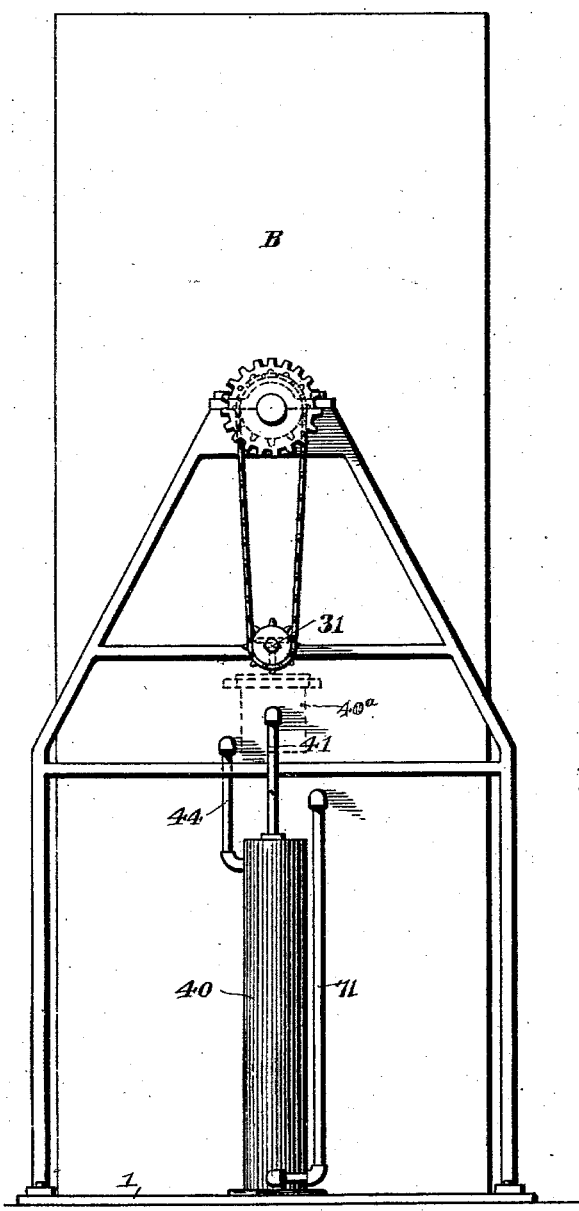
Figure 7:
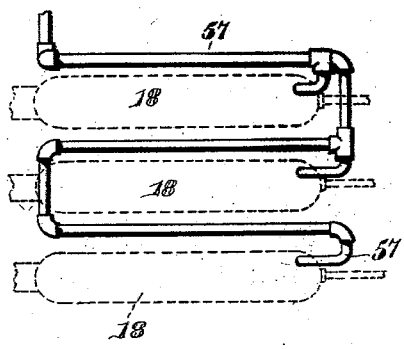

In said drawings, Figure 1 is a front elevation of my generator, the upper end of the casing being broken away. Fig. 2 is a view similar to Fig. 1, but showing the front of the outer casing broken away for the purpose of illustrating the arrangement of burners and the piping for supplying them with air and oil. Fig. 3 is a vertical sectional view through the generator, showing certain of the parts in elevation. Fig. 4 is a horizontal sectional view. Fig. 5 is a detail sectional view illustrating the construction and arrangement of one of the drier or side burners and its immediately adjacent parts. Fig. 6 is an elevation of one of the side burners, showing one of the coils communicating therewith and designed for the protection of the dome to prevent chilling of the steam. Fig. 7 is a detail view illustrating the manner in which certain sets of burners are placed in communication with coils disposed intermediate thereof. Fig. 8 is an end view of the casing, illustrating the relation of the power-shaft of a surmounting-motor to the pump-shaft, which serves to drive a number of pumps constituting elements of the generator. Fig. 9 is a sectional view of a portion of a generator, illustrating a modification of the means employed for leading the steam around the several side burners successively before its liberation in the steam-space. Fig. 10 is a detail plan view of one of the side burners illustrated in Fig. 9. Fig. 11 is a detail perspective view illustrating the modified form of dome shown in Fig. 9, and Fig. 12 is a sectional view of a modified form of feed device for the side burners.

Referring to the numerals employed to designate corresponding parts throughout the views, 1 indicates a bed-plate upon which is mounted the outer casing 2 of the generator. Within the casing 2 and spaced therefrom by suitable non-conductive material 3 are a pair of inner casings 4 and 5, disposed one above the other and separated by an interposed layer of non-conductive material 6, through which extend suitable bracing-standards designed to lend rigidity to the structure. The lower inner casing 5 is of much greater height than the casing 4 and is designed to contain the various appliances for the generation, superheating, and drying of steam prior to its delivery to the motor, the casing 4 being equipped with the various appliances for supplying the highly-heated water or saturated steam for conversion, as stated, within the chamber 5. Within the casing 5 and in suitably spaced relation to the end and bottom walls thereof is disposed the boiler-shell 7, suitably braced, as illustrated, and preferably additionally protected by the interposition of a non-conductive filler between it and the walls of the casing. This shell is of somewhat irregular form, as shown, for a purpose which will be hereinafter more fully apparent and at the center of its bottom wall is provided with a transversely-curved longitudinal depression 8, the opposite edges of which serve to support the corrugated side walls 9 of the furnace 10. The furnace is of approximately conical form in cross-section by reason of the upward convergence of the walls 9, the space between which at their upper ends is disposed in communication with a hood or dome 11, between which and the furnace-walls 9 is defined the generating or superheating chamber 12 of the device. The dome 11 is provided with a double wall defining an intermediate space or passage for the products of combustion passing from the interior of the furnace, and in order to cause these products to traverse and retraverse the entire surface of the dome it is provided with an interior substantially inverted U-shaped partition 13, defining circuitous passages leading from the inlet 14 of the dome around the lower edges of the partition 13 and finally to the egress opening 15 in the suitably braced and supported upper outer wall of the dome, as shown more clearly in Fig. 3. Within the furnace 10 are located a plurality of tubular burners 16, designed to project their flames against the walls 9 of the furnace, which for the purpose of insuring proper heating of these walls is provided with a number of deflecting-plates 17, disposed to effect the direct projection of the flame against those portions of the walls which are subjected in a manner to be described to immediate contact with the water or saturated steam. At opposite sides of the furnace and dome are disposed a plurality of side burners or "drying-burners" 18, as I prefer to call them. These burners are preferably disposed in tiers or sets housed within suitable sheet-metal casings 19 and 20, having the form of a series of substantially cylindrical burner-chambers and constituting continuations of the walls 9 of the furnace. These casings 19 and 20 are designed to confine the steam passing from the steam-space 12 or generating-chamber to effect its practical dehydration before delivery to the motor. It is therefore essential that the steam be compelled to pass around each of the side burners successively before delivery to the dry-steam space of the boiler. For the purpose of compelling the steam to take the circuitous course necessary to accomplish this result I provide horizontal partitions 21, extending between each pair of burners 18 and between the wall of the dome and the adjacent side burners. It will therefore appear that as the steam escapes from the chamber 12 around the lower edge of the dome it will be compelled to pass under each of the lowermost side burners successively, then back over these burners to the burner-chambers next above, where it will traverse a similar path and in like manner will pass around all of the burners before delivery to that portion of the boiler from whence the superheated steam is led to the motor for use. The projection of the saturated steam or water at a very high temperature, as the case may be, against the heated walls 9 of the furnace is effected by means of a series of flashing or spray tubes 22, having a number of small openings through which the jets of steam or water are projected against the walls 9 and instantly converted into vapor under high tension. This vapor or superheated steam escapes at once to the drying-chambers and after passing around the side burners escapes to the top of the inner casing 5 of the boiler for delivery to the motor.

Before proceeding with a description of the manner in which the burners are supplied with oil and air and in which the products of combustion are utilized for the purpose of protecting the dome against possible chilling I shall describe the manner in which the highly-heated water or saturated steam is accumulated in a chamber removed from the boiler proper and supplied under automatic regulation to the flashing-tubes 22.

Within the inner casing 4, which, as has been stated, is located above the casing 5, are disposed a pair of water-chambers 23 and 24, the former being designated as the "initial" water-chamber and the latter as the "hot-water" or "low-pressure" chamber. Each of these chambers is supplied with water in any suitable manner and is designed to be heated, but in different degree, the chamber 23 being intended merely as a supply-reservoir and initial heater for the chamber 24, within which the water is heated to a very high degree for delivery through a water-supply pipe 25 to the tubes 22. The chamber 23 is also employed as a condenser for the motor, which ordinarily surmounts the boiler-casing and is arranged to have its exhaust-steam pumped by means of a pump 26, through a condenser-pipe 27, to the interior of the chamber 23, where said exhaust-steam is condensed and is again utilized by being fed to the chamber 24 through a transfer-pipe 28. 29 and 30 indicate a pair of water-pumps of similar capacity located in each of the pipes 25 and 28 and operated through suitable intermediate gearing from a pump-shaft 31, designed to be geared to and driven by the motor being supplied with its motive agent from the generator. It will therefore be apparent that a predetermined liquid-level and steam-pressure will be constantly maintained within the chamber 24 as the water already pumped into said chamber through the pipe 28 from the chamber or tank 23 is exactly equal to the quantity pumped from the chamber or tank 24 for the supply of the generator. It is equally evident that an explosion is an utter impossibility, since it is impossible for the level of water in the tank 24 to fall below a predetermined point under any conditions. It is necessary, however, to provide against abnormal pressure within the generator proper, and this may be effectually accomplished by means for automatically regulating the supply of water to the flashing-tubes. At a suitable point in the pipe 25 I provide a controlling-valve 32, connected to one end of a crank-shaft 33, the crank of which is operatively connected with the stem 34 of the spring-pressed piston 35, constituting the regulating element of a pressure-regulator 36. Below the piston 35 the regulator 36 is in communication, through a pipe 37, with the superheating-chamber 12 of the generator, and it is evident that if the pressure of steam rises beyond the point at which the regulator has been set the resistance to the retraction of the piston 35 will be overcome and the valve 32 will be closed by the partial rotation of the rock-shaft 33. Consequently the instant an abnormal pressure is produced within the steam-chamber the supply of hot water or saturated steam from the tank 24 will be entirely cut off or reduced, as the case may be, until the steam-pressure has again become normal. It will be noted, however, that the pump 29 will, if the motor is in operation, continue to pump the water from the tank 24 even after the valve 32 has been automatically closed in the manner stated. It is therefore rendered necessary to relieve the pipe 25, and this is best done by providing it with a relief-pipe 38, leading back to the initial tank 23 and controlled by a relief-valve 39. When the pressure within the pipe 25 rises beyond a given point because of the closing of the valve 32, the relief-valve 39 will be forced to its open position and will permit the fluid pumped from the tank 24 to return to the initial tank 23. The result of this arrangement will be to effect a constant circulation between the two tanks, this circulation being maintained by the continued operation of the pumps 29 and 30 until the valve 32 has been again automatically opened by the operation of the pressure-regulator 36. Immediately upon the opening of the valve 32 the pressure upon the relief-valve 39 will be relieved, said valve will move to its closed position, and the supply of fluid to the flashing-tubes 22 will once more be effected through the pipe 25.

I have stated that the automatic regulation of the supply of steam may be effected by the regulation of the supply of water or low-pressure steam from the tank 24, and while this is true the regulation is rendered much more effective if the combustion within the furnace 10 is reduced simultaneously with the reduction of the water-supply.

The burners 16 and 18 are preferably of that type known as "hydrocarbon-burners" and are supplied with fuel from an oil-tank 40, located at any desired point exterior to the outer casing 2 and tapped by an oil-supply pipe 41, communicating through suitably-disposed branches with the several burners at the front end of the generator. The oil-supply pipe 41, like the water-supply pipe 25, is provided with a controlling-valve 42, disposed opposite the valve 32 and likewise connected to the rock-shaft 33 for operation by the pressure-regulator 36. Thus when the steam-pressure has risen sufficiently to operate the pressure-regulator it simultaneously closes both of the valves 32 and 42 to cut off or reduce, as the case may be, the supply of both water and fuel to reduce the combustion within the furnace and drying-chambers and to reduce the further generation of high-pressure fluid. Ordinarily the oil or vapor supply to the burners is maintained by means of an oil-pump 43, located in the pipe 41 and operated by the pump-shaft 31 in a manner similar to the operation of the pumps 26, 29, and 30. Inasmuch as the operation of all of the pumps is continuous as long as the motor is in operation it is necessary to provide for the relief of the oil-pipe 41 just as it was necessary to relieve the water-pipe 25 upon the closing of the valve 32. Therefore the pipe 41 immediately above the regulating or controlling valve 42 is placed in communication with a relief-pipe 44, communicating with the oil-tank 40 and controlled by a relief-valve 45, connected with the shaft 33 in a manner similar to the relief-valve 39 of the water-pipe and designed, like said valve, to open under pressure for the purpose of permitting a circulation of oil through the pipes 41 and 44 until such time as the pressure may be relieved by the reopening of the valve 42 as the steam-pressure again drops to the normal.

Under ordinary conditions it might seem to be objectionable to provide for the continuous operation of the several pumps employed in my device for effecting the feed of the water from one tank to the other and to the flashing-tubes, as well as the feed of exhaust-steam to the condensing-tank and of oil to the burners, inasmuch as the continuous operation of these feeding appliances necessitates the employment of the relief mechanism to accommodate the operation of an automatic regulator. It should be remembered, however, that the generator under discussion is intended for use upon motor-vehicles and that one of the essential features of generators of this character is the elimination of any considerable body of motive fluid under high tension—that is to say, the steam generated is intended to be used at once, the capacity of the generator being little, if any, more than that of the motor. Consequently it is not only desirable, but essential, that the operation of the generator be dependent upon the operation of the motor in order that the control of the motor will effect the automatic control of the generator without any necessity for devoting special attention to the latter. It will be noted that when the motor is at rest the pump-shaft 31 will not rotate, the several pumps will remain inactive, and the supply of fuel to the furnace and of fluid to the flashing-tubes will consequently cease, but will be reinaugurated the instant the throttle of the motor is thrown open. In order, however, to provide against the complete condensation of steam and the total extinguishment of the burners during the temporary stop, I provide what may be termed a "shunt fuel-pipe" 41$^a$, tapped into the fuel-pipe 41 in rear of the oil-pump 43 and communicating at its opposite end with the oil-pipe 41 at a point below the valve 42. The shunt-pipe 41$^a$ is controlled by a cock 41$^b$, operated by a link 41$^c$, extended to the exterior of the generator for the purpose of permitting the valve in the shunt-pipe being opened or closed by hand. This pipe constitutes means which when it is desired to stop the motor for a brief period of time may be manipulated to induce just sufficient feed of fuel to the burners to maintain a proper temperature in the generator and insure the operation of the pressure-regulator to open the water and fuel valves as soon as the throttle of the motor has been opened to continue the operation of the device. When the motor is started, the shunt-cock 41$^b$ is manually closed and the automatic operation of the motor will continue in an obvious manner. For the purpose of insuring a proper feed of oil through the shunt-pipe the oil-tank 40 is surmounted by a hand-pump 40$^a$, communicating therewith and designed to be utilized for the purpose of compressing air within the tank above the oil to effect the necessary forced feed. These continuously-operating pumps and relief devices have still another usefulness, which is of particular value in connection with the propelling mechanism of motor-vehicles—that is, the pumps, although continously operating, are automatically relieved when the regulator is operated to cut off the supply of water and oil, but are instantly effective as soon as the controlling-valves 32 and 42 are automatically opened by the regulator and the relief-valves 39 and 45 are automatically closed by the reduction of the opposed pressure.

It has now been made apparent in what manner the water-supply is kept separate and removed from the high-pressure chamber, in what manner the water is automatically supplied to the flashing-tubes and the oil to the burners, and how the products of combustion from the furnace 10 escape into the hollow dome and after traversing the walls of the latter escape from the egress-opening 15 at the top of the dome. It has also been explained in what manner the steam after passing from the chamber 12 is caused to circulate around the series of burners in the drying-chambers before its escape to the dry-steam space for delivery to the motor. It remains, however, to be explained how the products of combustion from the dome and from the side burners are disposed of and how the water is initially heated in the initial tank 23 and finally heated to a high degree and, in fact, converted into low-pressure vapor within the supply-tank 24 before delivery to the flashing-tubes 22 in the form of saturated steam. These several inquiries have been reserved for treatment at the same time because of their intimate relation, inasmuch as the products of combustion from the several burners 16 and 18 are utilized first within the dry-steam space to maintain the tension of the high-pressure fluid and finally within the tanks 23 and 24 for the heating of the water.

The burners 16 within the furnace 10 are of cylindrical form with rounded ends, as shown in Fig. 4, and are supported in place by burner-retaining bolts 46, extending axially from the rear ends of the burners and passed through the rear wall of the generator. The burners 18 are of similar form, but are somewhat smaller, being of less diameter, and are likewise provided with retaining-bolts passed through the casing of the generator. The front ends of the several burners 16 and 18 project beyond the inner front wall 47, Fig. 4, of the casing, the burners 18 being partially sustained by said wall.

As best seen in Fig. 3 of the drawings, the regulator 36, the relief-valves 39 and 45, and their connections are located within the inner casing 4 at the center thereof in a space provided for their reception between the water-chambers 23 and 24. Access to this space for the purpose of adjusting, repairing, or replacing these devices is had through an opening in the inner plate, with which is alined a hinged door 48, closing an opening in the front wall of the outer casing 2. The water and oil pipes 25 and 41, however, instead of extending directly through the bottom wall of the casing 4 are deflected laterally, as shown in Fig. 2 of the drawings, and are passed downwardly between the inner and outer plates to points adjacent to the base of the generator, where they are coupled by suitable fittings to branched pipes 49 and 50, the branches of the pipe 49 in communication with the water-pipe being coupled to the front ends of the flashing-tubes 22 (see Fig. 4) and the branches of the pipe 50 in communication with the oil-pipe being provided with nozzles 51, extending into the front ends of the burners. (See Fig. 5.) The passage of oil through each of the nozzles 51 is controlled by a cock 52 in the base thereof in order that in the event of accident any one of the burners may be out of service without affecting the operation of those remaining. Any suitable means may be provided for permitting the cocks 52 to be operated from the exterior of the generator—as, for instance, a valve-rod $52^a$, connected to the valve and extended through the outer wall of the generator, as clearly shown in Figs. 4 and 5.

It will appear to those skilled in the art that in addition to the injection of oil or vapor into the interior of the burners provision must be made for commingling with said vapor a sufficient quantity of air to promote the necessary combustion. I therefore provide a branched air-supply pipe 53, (see Figs. 4 and 5,) leading from the exterior of the generator to each burner and disposed intermediate of the burners and pipe 50 and provided, like the pipe 50, with commingling-nozzles 54, extending into the front ends of the burners. Inasmuch as I contemplate the circulation of air through the pipe 50 under the injective action of vapor escaping from the nozzles 51, I dispose the pipes 50 and 53 in close proximity and dispose the nozzles 51 through the rear sides of the fittings and into the nozzles 54. This coaxial relation of the nozzles 51 and 54, in view of the fact that the nozzle 51 does not extend quite to the extremity of the nozzle 54, induces an injective action, which as the vapor is projected into the burner draws in a quantity of air which, mixed with the vapor, forms a combustible gas.

The burners 18 within the drying and superheating chambers unlike the burners 16 are provided with individual cylindrical burner-casings 55, within which the combustion is inaugurated by means of minute openings 56 in the burners and around which the steam circulates as it passes from the chamber 12 on its way to the dry-steam space above the drying-chambers, from whence it is delivered to the motor. It will be seen, then, that the products of combustion must be led from these individual burner-casings 55, as well as from the upper end or top of the dome 11. This delivery of the products is effected in the following manner: From each of the side burners of the vertical tiers immediately adjacent to the dome are led flue-tubes 57, 58, and 59. The tubes 57 are led from the rear ends of the lowest side burners of these tiers and are coiled back and forth over the side faces of the dome and finally terminate in flue-heads 60 and 61, disposed above and at opposite sides of the vertical center of the dome. In like manner the tubes 58 and 59 are led successively from the next higher burners and are similarly coiled from end to end of the dome and connected to the heads. In this manner three separate and distinct coils of pipe, each supplied with hot products of combustion from an individual burner, are nested over each side of the dome to effectually protect the steam from being chilled and to insure the maintenance of the outer wall of the chamber 12 at a temperature which will facilitate the flashing of the steam without subsequent condensation. Thus it will be seen that the six burners adjacent to the opposite sides of the dome will first be utilized for the superheating and drying of the steam and subsequently to supply a heating agent to the coils nested about the dome, from which coils it escapes to the outer air through the heads 60 and 61. The vertical tiers of burners disposed immediately behind or to one side of those just considered are connected in series, respectively, by intermediate loops or coils which pass from end to end of the burners within the spaces defined between the circuitous passages of the drying-chamber, as best illustrated in Fig. 7—that is to say, the middle vertical row of each set of side burners is connected in series in the manner stated for the supply of products of combustion to heating-coils 62 and 63, located within the dry-steam spaces above the drying-chambers, each of said coils being in communication at its upper end with a multiple fitting 64 or 65. These coils are interwound with other coils 66 and 67, communicating with the extreme outer series of side burners in the manner recited in connection with the middle series and likewise in communication with the multiple fittings 64 and 65. In practice the burners are lighted by electrical lighting apparatus, the feed-wires of which are located between the casings and are led from a battery placed at a convenient point exterior to the generator; but as this lighting apparatus does not constitute a part of the present invention, but is simply auxiliary thereto, it has been deemed unnecessary to include it in the illustration.

It will now be seen that the six outer burners of each set at opposite sides of the dome are arranged to discharge their products of combustion into superheating and drying coils located within the dry-steam space of the generator and communicating with the multiple fittings, and in connection with this feature of the invention it remains only to be stated that the products of combustion escaping from the top of the dome are designed to be led through a flue-tube 68 to the fitting 65, this additional connection with the fitting 65 serving to augment the supply of the heating agent by the addition of all of the products of combustion produced within the furnace 10. In other words, the fitting 64 immediately below the initial heating-tank 63 is supplied with the products of combustion from six of the side burners, while the fitting below the supply-tank 24 is likewise supplied with heated products from the six side burners and in addition thereto is supplied from the five large burners within the furnace. The heating of the water within the tanks 23 and 24 is effected by means of heating-coils 69 and 70, connected up to the fittings 64 and 65, the coil 70 within the tank 24 being formed with a greater number of convolutions than the coil in the initial tank in order to give it a greater heating area, inasmuch as it will be remembered that while the water in the tank 23 is designed to be kept hot the water in the supply-tank 24 is intended to be maintained at a very high temperature, which will insure the delivery of the fluid to the flashing-tubes in the form of saturated low-pressure steam. Both of these heating-coils are disposed to discharge upon the exterior of the generator, and, if desired, a pipe 71, leading from the coil 69, may be disposed within such effective proximity to the oil-tank 40 as may be desirable for the purpose of keeping the oil at such temperature as will facilitate its immediate conversion into vapor upon its delivery for use.

For the purpose of heating water within the tanks 23 and 24 initially—that is to say, in starting the generator—I provide a pair of initial heating-pipes 72 and 73, extending through the heating-chambers from one of the burners disposed at each side of the dome, as best seen in Fig. 3. When it is desired to start the generator, all of the cocks 52 are left closed, with the exception of the cocks of the burners designed to supply the heating agent to the pipes 72 and 73. The hand-pump $40^a$ is then operated, and the valve $41^b$ in the shunt-pipe having been opened sufficient fuel will be supplied to the burners mentioned to cause the heating of the pipes 72 and 73 until the water within the heating-chambers has been raised to a sufficiently high temperature to permit the inauguration of the automatic operation of the generator. The usual steam-gages and safety-valves are also provided, and the motor supply-pipe $73^a$ is led from the steam-space to the motor A, of which only a fragment is illustrated. (See Fig. 3.) The motor, which is of a type illustrated in my concurrent application for Letters Patent of the United States, Serial No. 47,322, is suitably supported above the generator and is inclosed within a casing B, within which the exhaust from the motor is directed and is thence pumped into the initial heating-chamber 23 in the manner heretofore described.

Instead of providing for the circulation of the steam from the steam-dome and around the burner-casings by means of the sheet-metal casings 19 and 20 and the partitions 21 such circulation of the steam around the burner-casings may be effected in many other ways. For instance, I have illustrated in Figs. 9, 10, and 11 a possible variation of the construction illustrated in the preceding figures, which variation consists in closing the lower end of the steam-space 12 at each side of the dome by bending the opposite lower edges of the wall 9 around the lower end of the dome 11 to define troughs or chambers $12^a$ at opposite sides of the furnace. Each of these troughs or chambers is placed in communication with three steam-conducting pipes $20^a$, $20^b$, and $20^c$, which pipes are coiled successively around the several burner-casings of the adjacent side burners and open into the steam-space of the generator. As shown in Fig. 10, each of the steam-conducting pipes is wound around each burner for one-third of the length of the latter, the remaining two-thirds of the area of the burner-casing being taken up by the remaining pipes. By means of this construction the steam-conducting pipes are tapped into the dome at various points and after conducting the steam around the several side burners successively effect its liberation in a very dry superheated condition to the steam-space of the generator for delivery to the motor.

Another modification of the described structure is illustrated in Fig. 12 of the drawings and comprehends the elimination of the air pipe or tube 53. Instead of the tube 53 this modified construction comprehends the employment of a commingling-nozzle $53^a$, extending into the end of the burner and designed to receive the nozzle of the fuel-pipe 50. The commingling-nozzle $53^a$ opens into a circular air-casing $53^b$, disposed horizontally within the space between the furnace-walls 2 and 47, and said air-casing is closed at its outer end by a hinged cap or door $53^c$, provided with an air-regulating shutter $53^d$, by means of which the quantity of air to be admitted to the casing $53^b$ and thence to the burner is regulated. In this construction it is contemplated to employ a valve-operating rod $52^b$, similar to the rod $52^a$, (illustrated in Figs. 4 and 5,) but preferably terminating within the casing $53^b$ and accessible by means of the swinging door $53^c$.

From the foregoing it will appear that I have produced a simple and effective generator of the flash or instantaneous type in which the steam is removed from possible contact with either cold water or cool surfaces which might effect the lowering of its tension, also a device of this character in which the fluid is led to the boiler-space in the form of low-pressure or saturated steam and after having its tension raised by being sprayed against heated surfaces is passed through a circuitous drying-chamber and around superheating devices before its delivery to the motor. Furthermore, that my apparatus contemplates the automatic regulation of the water and fuel supply by means of regulating mechanism controlled automatically by the raising of the steam-pressure beyond a predetermined point, in addition to many other novel features contributing to the effective operation of the apparatus as a whole. Therefore, while the present embodiment of the invention appears at this time to be preferable, I desire to reserve the right to effect such changes, modifications, and variations as may be suggested by experience and experiment, so long as they are clearly embraced within the scope of the protection prayed.

What I claim is—

1. In a generator of the instantaneous type, the combination with a generating-chamber and heating means therefor, of a source of water-supply removed from said chamber and in communication therewith, controlling means intermediate of the chamber and said source of supply and operated by the pressure of steam within the steam-space of the generator to effect the automatic control of the water-supply.

2. In a generator of the instantaneous type, the combination with a generating-chamber, heating means and a source of water-supply in communication with the chamber, of a controlling device disposed to control the flow of water from the source of supply to the generating-chamber, a regulating device operated by the steam-pressure within the steam-space of the generator and operatively related to the controlling means, whereby the steam-pressure within the generator is automatically regulated.

3. In a generator of the instantaneous type, the combination with a generating-chamber, heating means therefor and a source of water-supply in communication therewith, of a water-supply pipe leading from the source of supply to the generating-chamber, a regulating device controlled by the steam-pressure within the steam-space of the generator for regulating flow of water through said supply-pipe, and means for automatically returning the water from the supply-pipe to the source of supply when the regulator is operated to reduce or discontinue the supply of water to the generating-chamber.

4. In a generator of the instantaneous type, the combination with a generating-chamber, heating means therefor and a source of water-supply, of a supply-pipe leading from the source of supply to the chamber, a controlling-valve and a relief-valve in said pipe, a regulator operated by the steam-pressure within the steam-space of the generator to close the controlling-valve, and means for pumping water through the supply-pipe to the generating-chamber.

5. In a generator of the instantaneous type, the combination with a generating-chamber, heating means therefor and a water-tank removed from the generating-chamber, of means for heating the water in said tank, and means for leading the heated water from the tank and for delivering it in the form of saturated steam to the generating-chamber.

6. In a generator of the instantaneous type, the combination with a generating-chamber and burners therefor, of a water-supply tank removed from the generating-chamber, means for leading products of combustion from said burners through the water-supply tank to heat the water therein, and means for leading the water from said supply-tank to the generating-chamber.

7. In a generator of the instantaneous type, the combination with a generating-chamber, flashing-tubes therein and a heater disposed to heat the walls against which the saturated steam is projected from the flashing-tubes, of a source of supply removed from the generating-chamber and in communication with the flashing-tubes, and means controlled by the steam-pressure within the generator for automatically regulating the supply of fluid to the flashing-tubes.

8. In a generator of the instantaneous type, the combination with a generating-chamber, flashing-tubes therein and heating means, of a water-supply tank removed from the generating-chamber and in communication with the flashing-tubes, means for heating the water in said tank, and a regulating device intermediate of the tank and tubes, said device being operated by the pressure of steam within the generator to control the supply of fluid to the tubes.

9. In a generator of the instantaneous type, the combination with a generating-chamber, flashing-tubes therein and burners disposed to heat the wall of said chamber against which the saturated steam is projected, a water-supply tank removed from the generator, a heating device arranged within the tank, means for leading the products of combustion from the generator-burners to said heater, a supply-pipe leading from the tank to the flashing-tubes, a controlling-valve in said pipe, and a regulating device disposed to operate said valve and operated by the steam-pressure within the generator.

10. In a generator of the instantaneous type, the combination with a generating-chamber, a burner disposed to heat the walls thereof, means for supplying water to the generating-chamber, means for supplying fuel to the burner, and means for automatically controlling the supply of both water and fuel.

11. In a generator of the instantaneous type, the combination with a generating-chamber, a burner, means for supplying water to the generating-chamber and means for supplying fuel to the burner, of means operated by the steam-pressure within the generator for controlling both the water and the fuel supply.

12. In a generator of the instantaneous type, the combination with a generating-chamber, a burner therefor, a source of water-supply in communication with the generating-chamber, a source of fuel-supply in communication with the burner, a controlling-valve intermediate of the generating-chamber and source of water-supply, a controlling-valve intermediate of the fuel-supply and burner, and a regulating device common to both of the controlling-valves and designed to be operated by excessive pressure of steam within the generator.

13. In a generator of the instantaneous type, the combination with a generating-chamber and burner therefor, of a source of water-supply, a source of fuel-supply, a water-pipe leading from the source of water-supply to the generator, a fuel-supply pipe leading from the source of fuel-supply to the burner, automatically-operated controlling-valves located in said pipes, means for forcing the water and fuel through said pipes, and automatically-operated relief devices disposed to effect the return of the water or fuel from the supply-pipes to the sources of supply when the controlling-valves are closed.

14. In a generator of the instantaneous type, the combination with a generating-chamber and burner, of flashing-tubes within the generating-chamber, a water-supply tank in communication with the flashing-tubes, a source of fuel-supply in communication with the burner, means for automatically regulating the supply of water and fuel to the tubes and burner, respectively, and means for heating the water within the supply-tank.

15. In a generator of the instantaneous type, the combination with a generating-chamber and burner, of means for supplying fuel to the burner, and a regulating device controlling the supply of fuel to the burner and operated by the pressure of steam within the generator.

16. In a generator of the instantaneous type, the combination with a generating-chamber and heating means therefor, of a source of water-supply in communication with the generating-chamber, a superheating-chamber in communication with the generating-chamber, and means for heating the superheating-chamber.

17. In a generator of the instantaneous type, the combination with a generating-chamber, heating means therefor and a source of water-supply in communication with the generating-chamber, of a superheating-chamber in communication with the generating-chamber and disposed to receive the steam therefrom, of a plurality of heating devices within the superheating-chamber, and means for leading the steam around said heating devices prior to its delivery to the motor.

18. In a generator of the instantaneous type, the combination with a generating-chamber, burners therefor and flashing-tubes within said chamber, of a source of water-supply in communication with said tubes, a superheating and drying chamber removed from but in communication with the generating-chamber, and separate means for heating the superheating-chamber.

19. In a generator of the instantaneous type, the combination with a generating-chamber, a series of burners disposed to heat the walls thereof, a series of flashing-tubes within the chamber, and a source of water-supply in communication with said tubes, of a circuitous superheating-chamber removed from but in communication with the generating-chamber, separate burners located within the superheating-chamber, and means for supplying fuel to the burners of the generator and superheater, respectively.

20. In a generator of the instantaneous type, the combination with a generating-chamber and burners therefor, of a superheating-chamber, a plurality of burners therein, said superheating-chamber being in communication with the generating-chamber but removed therefrom, a water-supply tank in communication with the generating-chamber, and means for leading the products of combustion from both the generator and superheater burners through said tank.

21. In a generator of the instantaneous type, the combination with a generating-chamber and burners, of a superheating-chamber in communication with the generating-chamber, separate burners for the superheating-chamber, means for supplying water to the generating-chamber, means common to all of the burners for supplying fuel thereto, and means for automatically regulating the supply of water and fuel.

22. In a generator of the instantaneous type, the combination with a generating-chamber and heating means, of a plurality of water-heating chambers removed from the generating-chamber, means for heating said chambers, means for leading water to said chambers successively, and means for leading water from one of said chambers to the generating-chamber.

23. In a generator of the instantaneous type, the combination with a generating-chamber and heating means, of an initial water-heating chamber, a low-pressure chamber, means for heating said chambers in different degree, means for leading water to said chambers successively, and means for leading water from the low-pressure chamber to the generating-chamber.

24. The combination with a generating-chamber, of an initial water-heating chamber, a low-pressure chamber, means for heating said chambers, means for leading water through said chambers successively and from the low-pressure chamber to the generating-chamber, automatically-operated controlling means for regulating the communication between the low-pressure chamber and generating-chamber, and means for directing the flow of water from the low-pressure back to the initial water-heating chamber.

25. In a generator of the instantaneous type, the combination with a generating-chamber, heating means therefor, a pair of superheating-chambers removed from but in communication with the generating-chamber, burners located within each of said superheating-chambers, a pair of water-heating chambers, means for leading water through said chambers successively and from one of said chambers to the generating-chamber, and heating devices for each of the water-heating chambers, said devices being provided with a heating agent by the burners of the superheating-chambers.

26. In a generator of the instantaneous type, the combination with a generating-chamber and heating means therefor, of a pair of superheating-chambers removed from but in communication with the generating-chamber, burners within each of the superheating-chambers, an initial water-heating chamber and low-pressure chamber in communication with the initial water-heating chamber, heaters within the initial water-heating chamber and low - pressure chamber, respectively, means for supplying a heating agent to said heaters from the burners of the superheating-chambers, and means for supplying the heater within the low-pressure chamber with the products of combustion from the heating devices of the generator.

27. In a generator of the instantaneous type, the combination with a generating-chamber, burners therefor and a jacket surrounding said chamber, of means for effecting the escape of the products of combustion from the burners through said jacket.

28. In a generator of the instantaneous type, the combination with a generating-chamber having its outer wall defined by a jacket, a partition within said jacket, ingress and egress openings in the wall of said jacket at opposite sides of the partition, and burners disposed to heat the inner walls of the generating-chamber and to supply heated products of combustion for circulation within the jacket and around the partition thereof.

29. In a generator of the instantaneous type, the combination with a generating-chamber having its outer wall defined by a jacket, flashing-tubes located within the generating-chamber, a source of water-supply in communication with said tubes, and burners disposed to heat the inner walls of the generating-chamber and to effect the circulation of the products of combustion within the jacket.

30. In a generator of the instantaneous type, the combination with a generating-chamber, burners therefor, superheating-chambers in communication with the generating-chamber, burners for the superheating-chambers, and heating-coils nested upon the generating-chamber and disposed to receive the products of combustion from the burners of the superheating-chambers.

31. In a generator of the instantaneous type, the combination with a generating-chamber provided with a hollow jacket and burners disposed to heat the inner walls of the generating-chamber and to supply products of combustion for circulation through the jacket, superheating-chambers removed from or in communication with the generating-chamber, burners located within said superheating-chambers, heating-coils nested upon the jacket of the generating-chamber and disposed to receive products of combustion from certain of the burners of the superheating-chambers, heating-coils located within the steam-space of the generator and in communication with certain of the superheater-burners, a plurality of water-heating chambers, means for supplying a heating agent thereto from the heating-coils, means for leading water through said heating-chambers successively, and means for supplying water from one of said chambers to the generating-chamber.

32. In a generator of the instantaneous type, the combination with a generating-chamber and heating means, of a pair of water-heating chambers, means for pumping water or steam into one of said chambers, means for pumping water from one chamber into the other, a supply-pipe communicating with the last-named chamber and with the generator, means for pumping water through said pipe, a valve-controlled relief-pipe leading from the water-supply pipe back to the first chamber, a source of fuel-supply, a fuel-supply pipe leading therefrom to the burners, means for pumping the fuel through said supply-pipe, and a valve-controlled relief-pipe leading from the fuel-supply pipe back to the source of fuel-supply, whereby the several pumping means may be operated continuously without interfering with the automatic operation of the generator.

33. In a generator of the instantaneous type, the combination with a generating-chamber and burners, of a water-supply tank, means for leading water from said tank to the generating-chamber, a casing surmounting the generator, a motor mounted within the casing and exhausting therein, and means for leading the exhaust-steam or water of condensation from the interior of said casing to the water-supply tank.

34. In a generator of the instantaneous type, the combination with a generating-chamber and heating means, of a superheater communicating with the generating-chamber, a series of burner-casings disposed within the superheater, a burner within each of said burner-casings, and means for compelling the steam as it passes through the superheater to circulate around each of the burner-casings.

35. In a generator of the instantaneous type, the combination with the generating-chamber provided with a hollow jacket, and burners disposed to heat the inner walls of the generating-chamber and to supply products of combustion for circulation through the jacket, superheating chambers removed from, but in combination with, the generating-chamber, burners located within the superheating-chambers, heating-coils nested upon the jacket of the generating-chamber and disposed to receive products of combustion from certain of the burners of the superheating-chambers, heating-coils located within the steam-space of the generator and in communication with certain of the superheating-burners, a plurality of water-heating chambers disposed to be heated by extensions of the heating-coils, and by a heating agent supplied to one of the water-chambers from the hollow jacket of the generating-chamber, means for leading water through the water-heating chambers successively and from one of the heating-chambers to the generating-chamber, flashing-tubes within the generating-chamber for effecting the instantaneous generation of steam, and means for regulating the supply of water to the generating-chamber, said regulating means being controlled by the pressure of steam within the steam-space of the generator.

In testimony that I claim the foregoing as my own I have hereto affixed my signature in the presence of two witnesses.

JAMES C. WALKER.

Witnesses:
F. M. MAXWELL,
JNO. T. BATTLE.